H. VORSANGER.
MACHINE FOR SPLITTING CARCASSES.
APPLICATION FILED NOV. 18, 1908.

986,105.

Patented Mar. 7, 1911.
6 SHEETS—SHEET 1.

WITNESSES:

INVENTOR
Herman Vorsanger
BY
his ATTORNEY

H. VORSANGER.
MACHINE FOR SPLITTING CARCASSES.
APPLICATION FILED NOV. 18, 1908.

986,105.

Patented Mar. 7, 1911.

WITNESSES:
Edwin W. Dietrich.
John R. Sperry.

INVENTOR
HERMAN VORSANGER
BY Conrad A. Dietrich
his ATTORNEY

UNITED STATES PATENT OFFICE.

HERMAN VORSANGER, OF NEW YORK, N. Y.

MACHINE FOR SPLITTING CARCASSES.

986,105.   Specification of Letters Patent.   Patented Mar. 7, 1911.

Application filed November 18, 1908. Serial No. 463,259.

*To all whom it may concern:*

Be it known that I, HERMAN VORSANGER, a citizen of the United States, residing at the city of New York, borough of Brooklyn, Kings county, in the State of New York, have invented certain new and useful Improvements in Machines for Splitting Carcasses, of which the following is a full, clear, and exact specification.

My invention relates to improvements in cutting machinery, and the same has for its object more particularly to provide a simple, efficient and reliable apparatus for rapidly and conveniently splitting the carcasses of beeves and other animals intended to be used for food.

Further, said invention has for its object to provide an apparatus for the purpose set forth, in which the cutting member is caused to perform its function with a rocking or oscillating movement.

Further, said invention has for its object to provide an apparatus in which the cutting member may be automatically retracted to its initial position after it has completely severed a carcass.

To the attainment of the aforesaid objects and ends my invention consists in the novel details of construction, and in the combination, connection and arrangement of parts hereinafter more fully described, and then pointed out in the claims.

In the accompanying drawings forming part of this specification, wherein like numerals of reference indicate like parts,
Fig. 8 is an enlarged detail section taken on the line 8—8 of Fig. 2, showing the arrangement of the telescoping tubes, and the heads thereon;
Figs. 9 and 10 are respectively top and bottom views showing the construction of the head and bifurcated bearing arranged at the lower end of the outer telescoping tube,
and Figs. 11 and 12 are similar views showing the construction of the head and bifurcated bearing of one of the inner telescoping tubes.

In said drawings 15 designates the apparatus as a whole comprising a cylindrical casing 16 provided midway of its height with a bracket 17 whereby said apparatus may be secured in a vertical position upon an overhead support 18.

Figure 2:
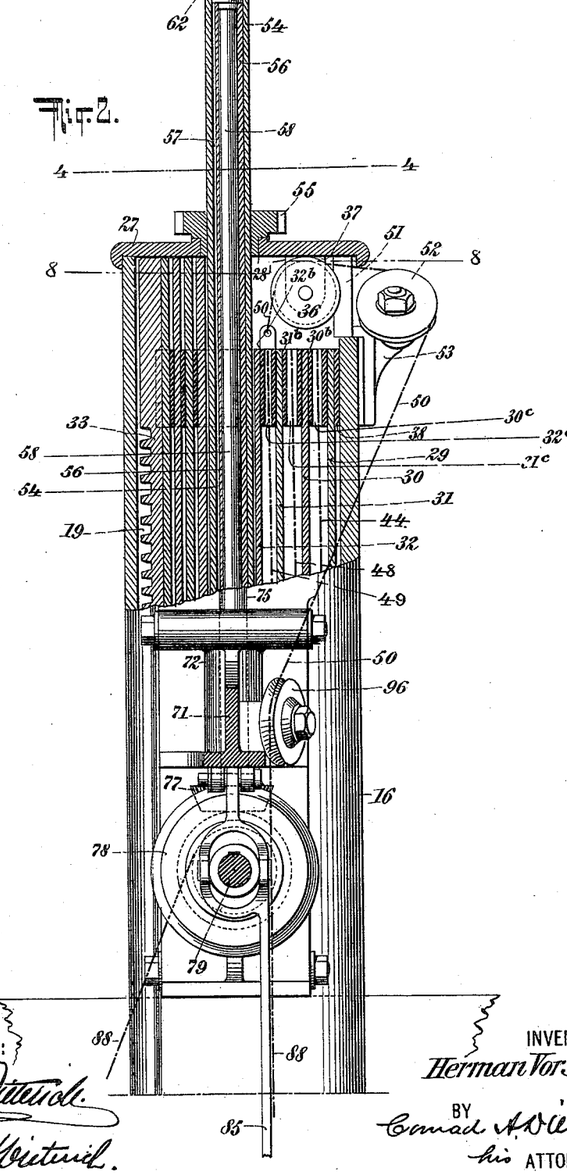
Figs. 2 and 3 conjointly constitute a side view, partly broken away and in section, showing the apparatus on an enlarged scale.
Figure 3:
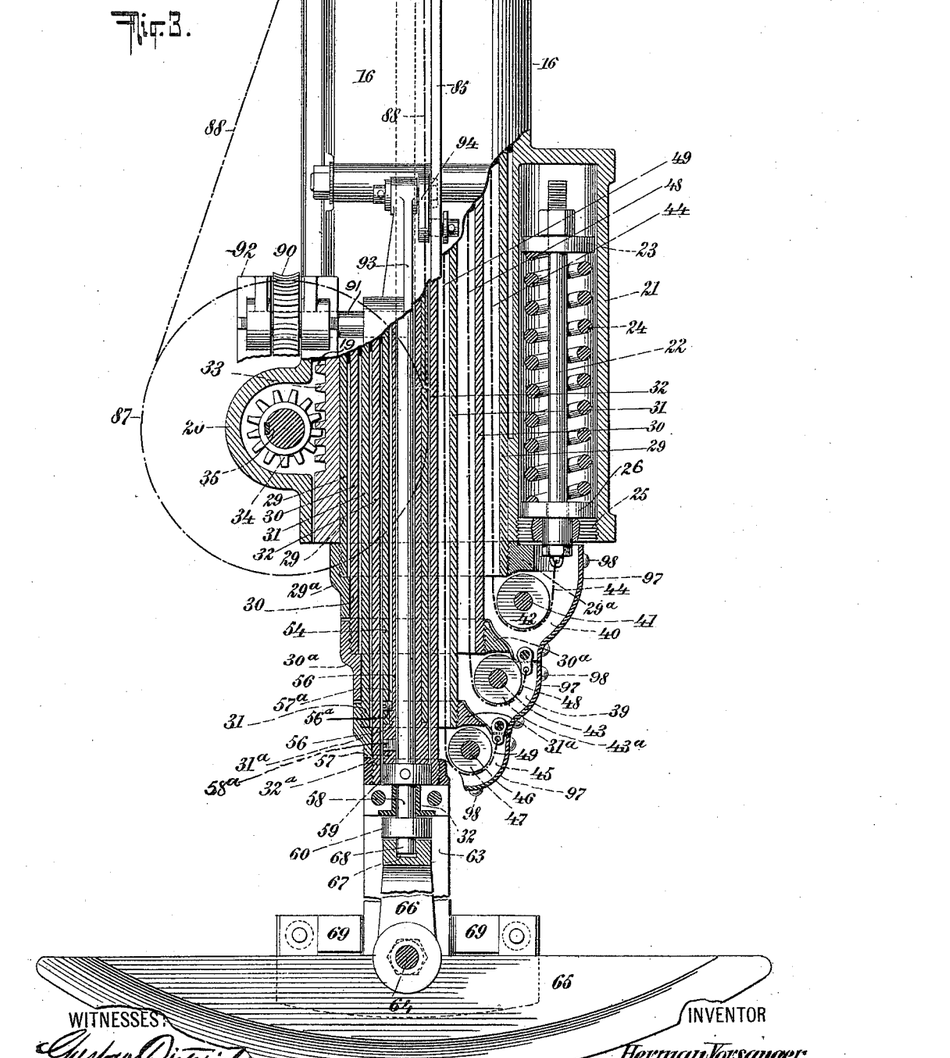
Figure 4:
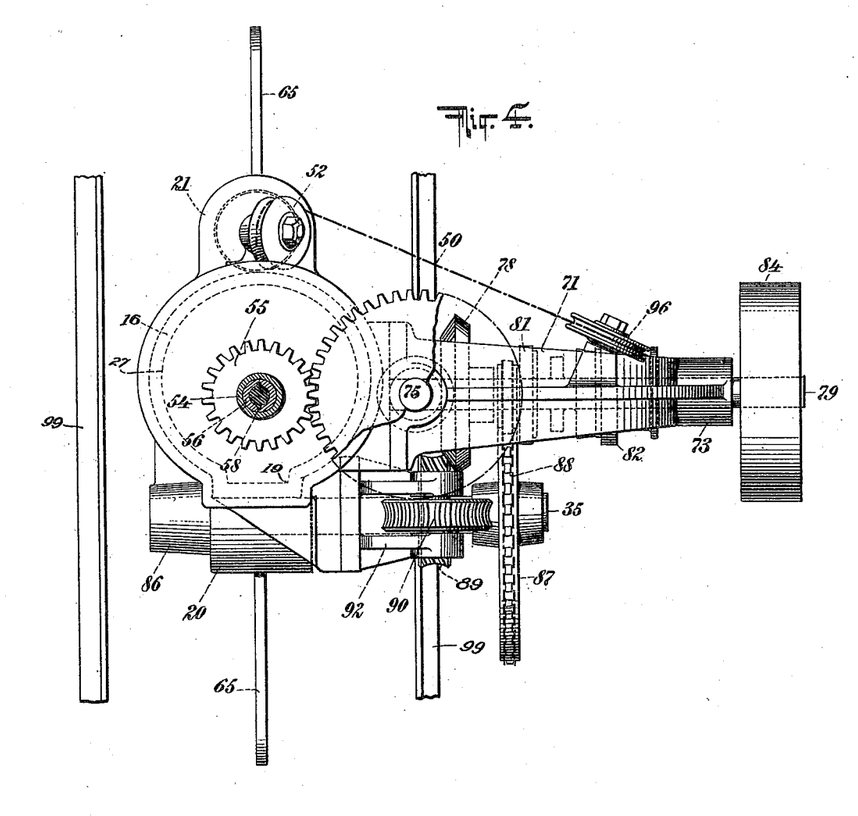
Fig. 4 is a transverse section on the line 4—4 of Fig. 2, showing the main portion of the apparatus in top view.
Figures 5, 6, 7:
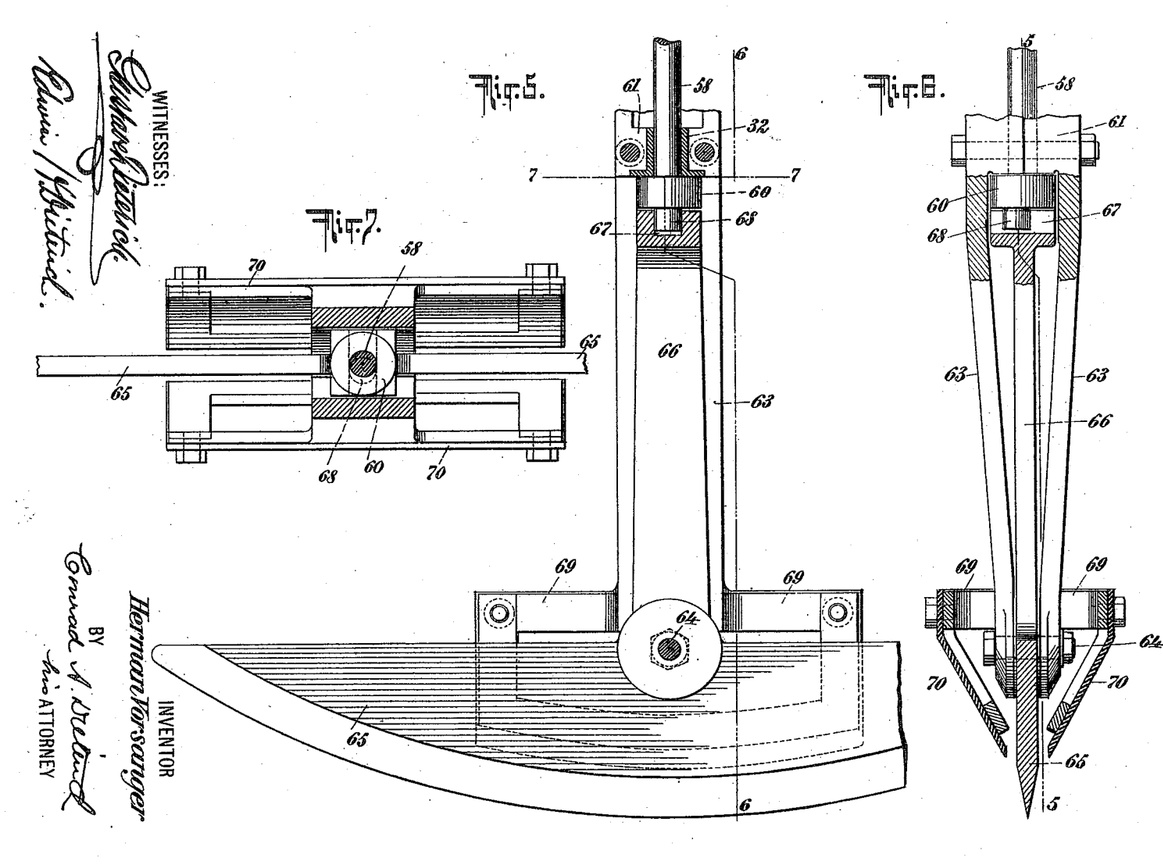
Fig. 5 is a vertical section taken on the line 5—5 of Fig. 6 showing the cutting member, and the operating means therefor.
Fig. 6 is a section taken on the line 6—6 of Fig. 5.
Fig. 7 is a transverse section taken on the line 7—7 of Fig. 5.
Figures 8, 9, 11:
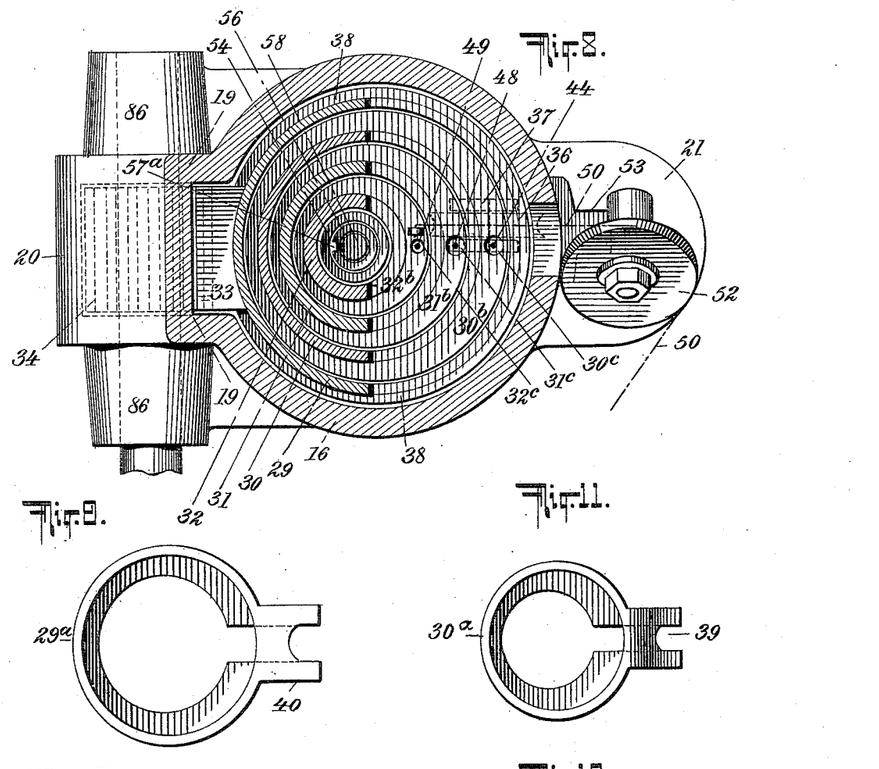
Figure 10:
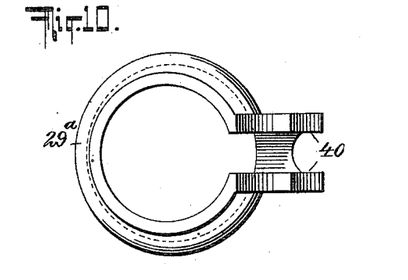
Figure 12:
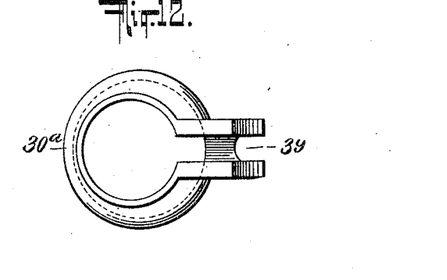

19 denotes a longitudinal recess provided in the inner wall of the casing 16, which terminates at its lower end in a gear case 20. Upon the opposite outer side of said casing is provided a cylindrical housing 21 in which works a rod 22 having a head 23 at its upper end, and a coil spring 24 arranged upon said rod intermediate said head 23, and the screw cap 25 at the bottom of said housing through which the lower end of the rod 22 extends. Upon the inner side of said cylindrical casing 16, at its open lower end is provided an abutment or stop 26, and at the upper end of said cylindrical casing 16 is secured a cap 27 having an eccentrically disposed aperture 28 therein. Within said casing 16 is disposed a series of telescoping tubes 29, 30, 31, 32, the outer tube 29 of said series having secured thereto along its side a longitudinal rack-bar 33, which is substantially co-extensive in height with said tube 29 and extends into the longitudinal recess 19 in the casing 16, and meshes with a pinion 34 mounted upon a shaft 35 supported in the housing or gear case 20 near the lower end of said casing 16. The tubes 29, 30, 31, 32 are each cut away at one side at their upper ends (the right hand side at Fig. 2), to accommodate a roller 36 supported in a depending bearing 37 carried by the cap 27. The tube 29 is provided adjacent to its upper end with a flange or collar 38 which is secured thereto just below its cut away portion, and has its ends terminating at each side of the rack bar 33. The lower end of the tube 29 is screw-threaded and upon said end is secured a head 29$^a$ having an eccentrically arranged aperture therein, and at one side a bifurcated depending bearing 40 having a pin 41 therein upon which is mounted a roller 42. Within said outer tube 29 is arranged a second tube 30 which is provided at its lower end with a head 30$^a$ having an eccentrically arranged aperture therein and a depending bifurcated bearing 39 at one side in which is secured a pin 43 carrying the roller 43$^a$. At the upper end of said tube 30 is secured a circular head 30ᵇ having an eccentrically arranged aperture therein within which is secured the upper end of said tube 30 and 30ᶜ denotes a vertical opening extending through said circular head 30ᵇ.

44 denotes a chain which is secured at one end to the projecting end of the rod 22 arranged in the casing 21, and its other end passed over the roller 42 and then upwardly intermediate the outer tube 29 and the second tube 30 and secured in the vertical opening 30ᶜ provided in the circular head 30ᵇ secured to the upper end of the second tube 30.

Within the second tube 30 works a third tube 31 having a circular head 31ᵃ secured to its lower end, provided with an eccentrically arranged aperture, and a depending bifurcated bearing 45 at one side in which is supported a pin 46 carrying a roller 47. The upper end of said third tube 31 is provided with a circular head 31ᵇ having an eccentrically arranged aperture therein, into which is fitted the upper end of said tube 31, and a vertical opening 31ᶜ.

48 denotes a chain or cable having its lower end secured to the bearing 40 arranged at the lower end of the outer tube 29 and passed over the roller 43ᵃ of the second tube 30 and thence carried upward between said second tube 30 and third tube 31 and secured in the vertical opening 31ᶜ provided in the head 31ᵇ secured to the upper end of said third tube 31.

Within the third tube 31 is arranged to work a fourth tube 32 which is provided at its lower end with a head 32ᵃ having a centrally located aperture therein, and at its upper end said fourth tube 32 is provided with a head 32ᵇ having an eccentrically arranged opening therein into which is fitted the upper end of said tube 32. The circular head 32ᵇ is further provided with a vertical opening 32ᶜ and 49 denotes a chain having its lower end secured to the depending bearing 39 arranged at the lower end of the second tube 30 and thence passed over the roller 47 arranged at the lower end of the third tube 31 and carried upwardly in the space between the third tube 31 and the fourth tube 32, and secured in the vertical opening 32ᶜ provided in the head 32ᵇ secured to the upper end of said fourth tube 32.

50 denotes a chain which is secured at its inner end to the head 32ᵇ and thence passed over the roller 36 supported in the bearing 37 on the underside of the cap 27, and thence outwardly through an opening 51 in the casing 16 and over a second pulley 52 which is supported in an inclined bearing 53 mounted upon the outer side of the casing 16 adjacent to the opening 51 therein.

Within the fourth tube 32 is arranged a tube 54 upon the projecting end of which above the cap 27 of the casing 16 is fixed a gear wheel 55, and within said tube 54 is disposed a tube 56 which fits closely into said tube 54 and is provided with a longitudinal groove 57ᵃ into which extends a screw 58ᵃ secured in the tube 54 in order to hold said tubes 54 and 56 keyed together and to permit of the tube 56 being moved or telescoped within the tube 54 when the apparatus is in operation.

Within the tube 56 which is provided at its lower end with a head 57 is secured a shaft 58 having heads 59 60 at its lower end intermediate which is secured a yoke 61 carrying the cutting mechanism. The upper end of the shaft 58 is provided with a head 62 which fits within the outer tube 54 and bears upon the upper end of the inner tube 56. Between the lower ends 63, 63 of the yoke 61 is secured a bolt 64 upon which is pivotally mounted a knife 65 having an upwardly extending arm 66 provided with a transverse recess 67 into which extends an eccentric 68 extending from the underside of the head 60 of the shaft 58. To the sides of the members 63, 63 of the yoke 61, adjacent to the central portion of the blade 65, are secured bearings 69 69 to the outer sides of which are bolted the inwardly inclined guards 70 70 which serve to hold the carcass separated for the action of the blade 65. Adjacent to the upper end of the casing 16 is secured a laterally projecting bracket 71 having a vertical bearing 72 and horizontal bearings 73 73 thereon, and at the extreme upper end of the casing 16 is secured a vertical bearing 74.

75 denotes a shaft, supported in the bearings 72 74, upon the upper end of which is fixed a gear wheel 76 meshing with the gear wheel 55 on the tube 54 surrounding the shaft 58, and at the lower end of the shaft 75 is fixed a bevel gear 77 meshing with a bevel gear 78 loosely mounted upon the horizontal shaft 79 supported in the bearings 73 73. Upon the said shaft 79 is mounted a sprocket wheel 80 and a clutch comprising the members 81, 82. The member 81 is fixed with the bevel gear 78, and the sprocket wheel 80 to a sleeve 83 upon the shaft 79, and the member 82 fixed to the drum 95 loosely mounted upon said shaft 79, and upon the outer end of the shaft 79 is a driving pulley 84. The movable clutch member is slidably keyed on the shaft 79, and comprises two parts or members 81ᵃ 82ᵃ which are adapted to engage respectively with members 81 on the shaft 79, and the member 82 on the drum 95 and be actuated by means of a lever 85 having its upper end pivotally secured to the bracket 71 and connected to the movable clutch member intermediate the members 81ᵃ 82ᵃ. Upon the outer end of the shaft 35, which is supported in the bearings 86, 86 of the gear case 20, is fixed a large sprocket wheel 87 and connected by a chain belt 88 with the sprocket wheel 80 on the shaft 79.

89 denotes a worm gear fixed on the shaft 35 which meshes with a gear 90 supported upon a shaft 91 mounted in bearings 92 secured to the casing 16 directly above the shaft 35.

93 denotes an arm fixed upon the end of the shaft 91 which engages the slotted end of a link 94 pivotally secured to the lever 85.

96 denotes a roller mounted upon a bracket 71 above the drum 95 over which roller passes the chain 50 having its outer end secured to the drum 95.

97, 97, 97, denote covering sections which are secured by means of screws 98, 98 98 to the outer surfaces of the bifurcated depending bearings 40, 39, 45, said sections being conformed to the outline of said bearing portions and adapted to inclose the same and the rollers mounted therein.

Figure 1:
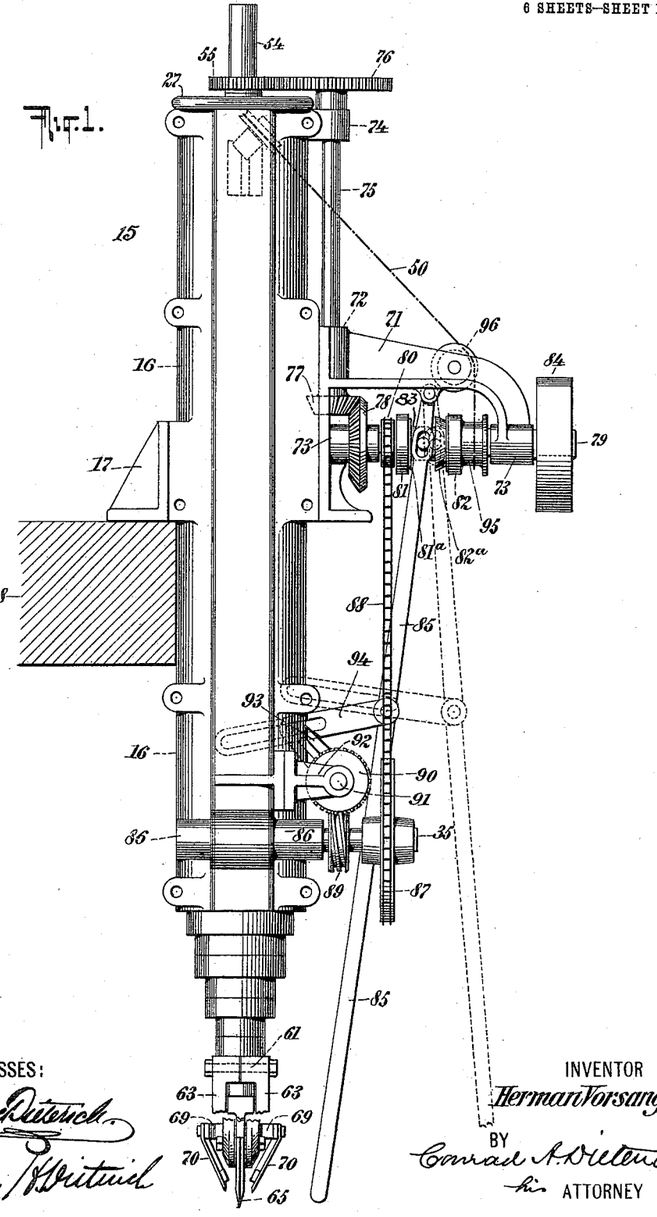
Figure 1 is an end view, partly broken, showing one form of apparatus constructed according to, and embodying my said invention.

The operation of the apparatus is as follows: Assuming the parts to be as shown in full lines at Fig. 1, and the clutch member 82$^a$ to be in engagement with the member 81 on the shaft 79 a rotary movement is imparted to the shaft 79, bevel gears 78, 77, shaft 75, gears 76 to the gear 55 upon the tube 54 surrounding the shaft 58 and tube 56, thereby causing the shaft 58 to rotate and actuate the eccentric 68, and cause the knife 65 to be rocked by means of the arm 66 secured to said knife and engaged by the eccentric 68. With the rotation of the shaft 79 movement will also be simultaneously imparted to the sprocket wheel 80 and by means of the chain belt 88 to the sprocket wheel 87 on the shaft 35, and the pinion 34 in engagement with the rack-bar 33 of the outer tube 29 and cause said tube to descend, and as said tube 29 descends it will cause the chain 44 to draw down the second tube 30, and this, in succession, will cause the chain 48 to draw down the third tube 31, and this again, in succession, will cause the chain 49 to draw down the fourth tube 32 which carries the sliding tube members 54, 56 surrounding the shaft 58 and cause the cutting blade 65 to descend with a rocking or oscillating movement. As the telescoping tubes descend the rotating tubular members 54, 56 surrounding the shaft 58 will also be extended, and in order to permit said tubular members 54, 56, and shaft 58 to be rotated the member 56 is secured at its lower end by a screw 56$^a$ to the shaft 58, and is provided in its side with a longitudinal slot 57$^a$ into which extends a screw 58$^a$ secured in the tubular member 54. As soon as the blade has descended to the extreme of its downward movement, the arm 93 fixed upon the shaft 91 will be shifted and cause the end thereof, which is in engagement with the slotted end of the link 94 to move said link and the lever 85 outward to assume the position indicated by dotted lines at Fig. 1, and thereby throw the clutch member 82$^a$ on the shaft 79 into engagement with the clutch member 82 on the drum 95, and cause the chain 50 to be wound up upon said drum and thereby successively draw the tube members 32, 31, 30 and 29, in the order named, upwardly into the outer casing 16. In the course of the inward or upward movement of the telescoping tube members the strain upon the chains 44, 48, 49, 50 will be taken up by the yielding of the rod 22 which is spring supported in the casing 21.

In the accompanying drawings one form of means has been shown for supporting the carcass to be severed. Any suitable means for supporting the carcass may be employed, however, in connection with the apparatus, for example the means commonly used consisting of two suitably supported parallel rails 99, 99 upon which rollers are adapted to work having hook members thereon from which the carcass may be suspended by securing the hind legs thereto and then shifting the same into operative position for the action of the oscillating knife 65 may be used.

Having thus described my invention, what I claim and desire to secure by Letters Patent is:

1. An apparatus of the character described comprising a frame, an extensible support therein, a knife carried by said support, and means for projecting said support and carrying said knife into engagement with a carcass, substantially as specified.

2. An apparatus of the character described comprising a frame, an extensible support therein, a knife carried by said support, means for projecting said support and carrying said knife with a rocking movement into engagement with a carcass, substantially as specified.

3. An apparatus of the character described comprising a casing, a telescoping support arranged therein, a knife carried by said telescoping support, and means for projecting said telescoping support and actuating said knife, substantially as specified.

4. An apparatus of the character described comprising a casing, a telescoping support arranged therein, a knife carried by said telescoping support, means for projecting said telescoping support and actuating said knife, and means for retracting said telescoping support, substantially as specified.

5. An apparatus of the character described comprising a vertical casing, a telescoping support arranged to work within said casing, a shaft revolubly disposed within said telescoping support, a knife secured to said telescoping support, means for projecting said support, and means for rotating said shaft to oscillate said knife, substantially as specified.

6. An apparatus of the character described comprising a vertical casing, telescoping support arranged to work within said casing, a shaft revolubly disposed within said telescoping support, a knife secured to said telescoping support, means for projecting said support, means for rotating said shaft to oscillate said knife, and means for automatically retracting said telescoping support within said casing, substantially as specified.

7. An apparatus of the character described comprising a vertical casing, telescoping support arranged to work within said casing, a shaft revolubly disposed within said telescoping support, a knife secured to said telescoping support, means for projecting said support, means for rotating said shaft to oscillate said knife, and means for automatically retracting said telescoping support within said casing, substantially as specified.

8. An apparatus of the character described comprising a cylindrical casing, means for supporting said casing in a vertical position, a series of telescoping tubes arranged to work within said casing, an extensible shaft arranged within said telescoping support, a frame carried by said telescoping support, a knife pivotally mounted in said frame, means on said shaft in engagement with the arm on said knife, means for rotating said shaft, and means for projecting said telescoping support, substantially as specified.

9. An apparatus of the character described comprising a cylindrical casing, means for supporting the same, a series of telescoping tubes arranged in said casing, a tube revolubly supported in said casing within said telescoping tubes, means for rotating said tube, an extensible shaft arranged in said tube and adapted to rotate therewith, an eccentric on said shaft, means for rotating said tube and extensible shaft, a frame carried by said telescoping tubes, a knife pivotally supported in said frame, an arm on said knife, connected to the eccentric on said extensible shaft, means for projecting said telescoping tubes and shaft, and means for retracting said telescoping tubes and shaft at the limit of their movement, substantially as specified.

10. In an apparatus of the character described a cylindrical casing, means for supporting the same, a series of telescoping tubes arranged in said casing, means on the outermost of said tubes for raising and lowering the same within said casing, flexible connections having their inner ends secured to the upper ends of said tubes, and their outer ends secured to the lower ends of alternate tubes, a tube disposed within the innermost of said telescoping tubes having a gear fixed thereon, an extensible shaft secured therein and adapted to rotate therewith, a knife on said shaft, and means for rotating said tube and inclosed extensible shaft, substantially as specified.

11. In an apparatus of the character described a cylindrical casing, means for supporting the same, a series of telescoping tubes eccentrically arranged in said casing, a rack upon the outermost of said tubes, a shaft on said casing, a pinion thereon in mesh with said rack-bar, means for rotating said shaft and pinion, rollers at the lower ends of said tubes, flexible connections having their upper ends secured to the upper ends of said tubes, and their lower ends passed over said rollers and secured to the lower ends of alternate tubes and said cylindrical casing, a tube arranged within the inner of said telescoping tubes and projecting out of said casing, a gear fixed thereon above said casing, a pin in said tube, a shaft in said tube having a longitudinal slot therein to receive said pin, a knife carried by said shaft, and means for rotating said gear, tube and shaft, substantially as specified.

12. In an apparatus of the character described, a cylindrical casing, means for supporting the same, a series of telescoping tubes arranged in said casing provided at their upper and lower ends with heads having eccentrically-arranged apertures therein, rollers mounted on the heads at the lower ends of said tubes, a rack bar on the outer of said telescoping tubes, a shaft supported in said casing, a sprocket wheel and a worm gear fixed thereon, a pinion on said shaft in mesh with said rack bar, a shaft support above said shaft having an arm thereon and a gear in mesh with said worm gear, flexible members secured at their upper ends to the heads at the upper ends of said telescoping tubes, and their lower ends extending over the rollers at the bottom of the next surrounding tube and their ends secured to the lower ends of the next tubes and inclosing said roller carrying tubes, and the last of said ends secured to a yielding device on said casing, a frame secured to the lower end of the inner of said tubes, a knife mounted therein, a tube supported within the inner of said telescoping tubes and projecting out of said casing, a gear fixed on said tube above said casing, a shaft, means on said shaft for actuating said knife, a sleeve secured to and surrounding said shaft having a longitudinal slot therein, a pin in said revoluble tube extending into said slot, a vertical shaft on said casing, a gear thereon meshing with the gear on said revoluble tube, a bevel gear fixed on said vertical shaft, a horizontal shaft on said casing, a sleeve mounted thereon, a bevel gear in mesh with the bevel gear on said vertical shaft, a sprocket wheel, a chain belt connecting said sprocket wheel with the sprocket wheel at the lower end of said casing, and clutch member on said sleeve, a drum and clutch member loosely mounted on said horizontal shaft, a flexible member secured to said drum, and the upper end of the inner telescoping tube, a double clutch slidably mounted upon said horizontal shaft, a lever pivotally supported on said casing and secured to said slidable clutch, and a link pivotally secured to said lever and to said arm on the shaft supported adjacent to the bottom of the casing, substantially as specified.

13. In an apparatus of the character described, a support, a frame carried thereby, a knife pivotally mounted therein, a rigid member thereon, a shaft revolubly mounted in said support, and means on said shaft engaging said rigid member for actuating said knife, substantially as specified.

14. In an apparatus of the character described, a support, a frame carried thereby, a knife pivotally mounted therein, a rigid arm on said knife, a shaft revolubly mounted in said support, and means on said shaft in engagement with said arm for actuating said knife, substantially as specified.

15. In an apparatus of the character described a support, a frame carried thereby, a knife pivotally mounted therein, an arm rigid upon said knife, a shaft revolubly mounted in said support, and an eccentric on said shaft in engagement with the free end of said arm for actuating said knife, substantially as specified.

16. In an apparatus of the character described a support, a frame carried thereby, a knife pivotally mounted therein, an arm rigid upon said knife and projecting therefrom, a recess in the free end of said arm, a shaft revolubly mounted in said support, an eccentric on said shaft in engagement with the slotted end of said arm for actuating said knife, substantially as specified.

17. In an apparatus of the character described a support, a frame carried thereby, a knife pivotally mounted therein, an arm rigid upon said knife projecting therefrom, a transverse recess in said arm, an extensible shaft mounted in said support, and an eccentric on said shaft in engagement with the slotted end of said arm for actuating said knife, substantially as specified.

Signed at the city of New York, in the county and State of New York, this twenty-first day of December, nineteen hundred and seven.

HERMAN VORSANGER.

Witnesses:
 CONRAD A. DIETERICH,
 A. R. ANGUS.

---

Copies of this patent may be obtained for five cents each, by addressing the "Commissioner of Patents, Washington, D. C."